United States Patent
Wyatt

(10) Patent No.: US 7,021,802 B1
(45) Date of Patent: Apr. 4, 2006

(54) BOAT LIGHT APPARATUS INCLUDING NAVIGATION LIGHT AND DETACHABLE DOCKING LIGHT

(76) Inventor: Jeffrey L. Wyatt, 2946 Harrison Ave., Cincinnati, OH (US) 45211

( * ) Notice: Subject to any disclaimer, the term of this patent is extended or adjusted under 35 U.S.C. 154(b) by 88 days.

(21) Appl. No.: 10/832,878

(22) Filed: Apr. 26, 2004

(51) Int. Cl.
*F21V 1/00* (2006.01)

(52) U.S. Cl. .................. 362/477; 362/652; 362/659; 362/234

(58) Field of Classification Search ............... 362/652, 362/659, 477, 231, 234, 496, 493
See application file for complete search history.

(56) References Cited

U.S. PATENT DOCUMENTS

| | | | | |
|---|---|---|---|---|
| 1,771,415 A | * | 7/1930 | Neuner | 362/234 |
| 3,192,376 A | * | 6/1965 | Najimian, Jr. | 362/477 |
| 4,884,173 A | * | 11/1989 | Cassidy | 362/477 |
| 5,339,225 A | * | 8/1994 | Wiggerman | 362/477 |
| 5,508,895 A | * | 4/1996 | Wagoner, Jr. | 362/477 |
| 5,537,299 A | * | 7/1996 | Perry | 362/477 |
| 6,174,078 B1 | * | 1/2001 | Ohm et al. | 362/477 |
| 6,659,622 B1 | * | 12/2003 | Katogi et al. | 362/219 |
| 2001/0024369 A1 | * | 9/2001 | Kitchin | 362/477 |

OTHER PUBLICATIONS

Web page for Golight Remote Control Navigation Light available at www.cabelas.com.

* cited by examiner

*Primary Examiner*—John Anthony Ward
*Assistant Examiner*—Jacob Y. Choi
(74) *Attorney, Agent, or Firm*—Jack Lo

(57) ABSTRACT

A boat light apparatus is comprised of a navigation light and a detachable docking light. The navigation light is comprised of a navigation light housing with a low power navigation light lamp behind a lens. A socket is positioned at the top of the navigation light housing. Electrical connectors are positioned inside the socket. A detachable docking light for mating with the navigation light is comprised of a docking light housing with a high power docking light lamp inside. Docking light housing is hinged to the top of a mounting post for positioning inside the socket in the navigation light. Electrical connectors are positioned at the bottom of the post for mating with the connectors inside the socket. Navigation light lamp and docking light lamp are connected in parallel for connecting to the navigation light switch in a boat. A step relay is connected between the docking light lamp and the navigation light switch.

2 Claims, 2 Drawing Sheets

TO POWER SUPPLY

BOAT LIGHT APPARATUS INCLUDING NAVIGATION LIGHT AND DETACHABLE DOCKING LIGHT

BACKGROUND OF THE INVENTION

1. Field of the Invention

The invention broadly relates to navigation lights on boats.

2. Prior Art

A navigation light is a low power colored light on the bow of the boat for indicating the position of the bow during docking maneuvers. Some boats also have a bright docking light for illuminating the path ahead during docking. Some docking lights are permanently mounted, and some are detachable for use only when needed. The permanently mounted lights are unsightly and get in the way. They are also difficult to install. The detachable lights are usually mounted with suction cups, which are unreliable, and require a cigarette lighter socket for power. The external power cords on the detachable lights are a nuisance and a trip hazard. Some boats lack the cigarette lighter socket required for powering detachable lights.

BRIEF SUMMARY OF THE INVENTION

The objects of the present boat light apparatus are:
- to be an easily installed replacement for prior art navigation lights;
- to indicate the position of a bow;
- to illuminate the path ahead with a detachable docking light;
- to enable the docking light to be easily detached and reattached to the navigation light.

The boat light apparatus is comprised of a navigation light and a detachable docking light. The navigation light is comprised of a navigation light housing with a low power navigation light lamp behind a lens. A socket is positioned at the top of the navigation light housing. Electrical connectors are positioned inside the socket. A detachable docking light for mating with the navigation light is comprised of a docking light housing with a high power docking light lamp inside. Docking light housing is hinged to the top of a mounting post for positioning inside the socket in the navigation light. Electrical connectors are positioned at the bottom of the post for mating with the connectors inside the socket. Navigation light lamp and docking light lamp are connected in parallel for connecting to the navigation light switch in a boat. A step relay is connected between the docking light lamp and the navigation light switch.

DRAWING REFERENCE NUMERALS

10. Navigation light
11. Docking light
12. Housing
13. Mounting Screw
14. Lens
15. Navigation light Lamp
16. Socket
17. Cover
18. Tether
19. Connectors
20. Housing
21. Docking light Lamp
22. Mounting Post
23. Connectors
24. Lead
25. Lead
26. Boat Light Switch
27. Step Relay

DETAILED DESCRIPTION OF THE INVENTION

FIG. 1

Figures 1, 2:
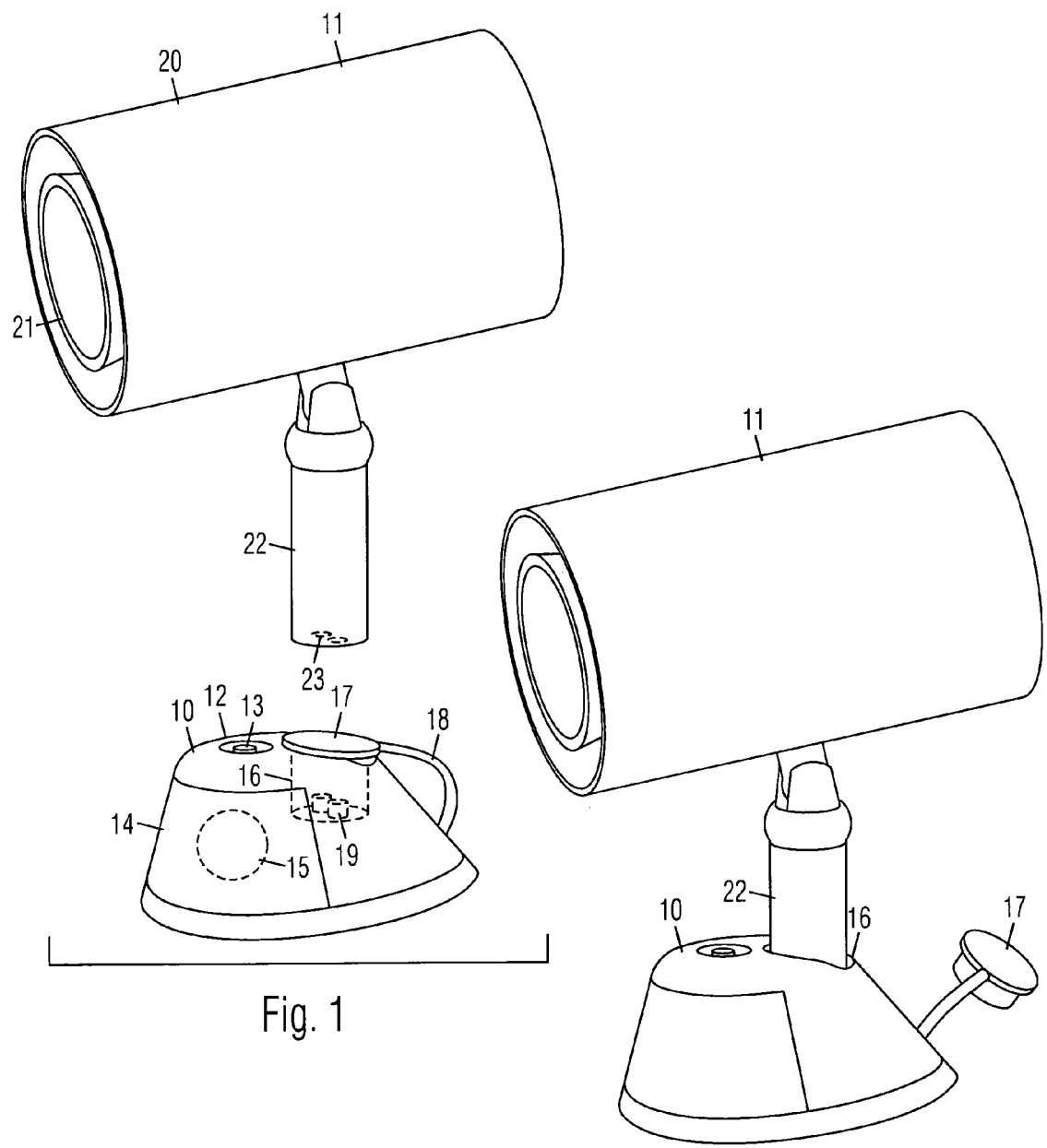
FIG. 1 is a side perspective view of the boat light apparatus with a docking light detached from a navigation light.
FIG. 2 shows the docking light attached to the navigation light.

A boat light apparatus shown in FIG. 1 is provided as a direct replacement for a typical prior art navigation light on the bow of a boat. Boat light apparatus is comprised of a navigation light 10 and a detachable docking light 11.

Navigation light 10 is comprised of a navigation light housing 12 with a mounting screw 13 for easily attaching to the same position vacated by the prior art navigation light. A colored lens 14 is positioned at the front of housing 10, and a low power navigation light lamp 15 is positioned behind lens. A mechanical connector or socket 16 is positioned at the top of housing 12, and is sealed by a removable cover 17 connected to housing 12 with a tether 18. Electrical connectors 19 are positioned inside socket 16.

Docking light 11 is comprised of a docking light housing 20 with a high power docking light lamp 21 inside. Housing 20 is pivoted to the top of a mounting post 22 which is arranged to be positioned inside socket 16. Housing 20 is adjustable in azimuth and elevation. Electrical connectors 23 are positioned at the bottom of post 22 for mating with connectors 19 inside socket 16.

FIG. 2

Docking light 11 is shown in FIG. 2 attached to navigation light 10. Cover 17 is removed from socket 16 in housing 10, and post 22 is positioned inside socket 16. Docking light 11 may be attached to navigation light 10 when need and removed when not needed.

FIG. 3

Figure 3:
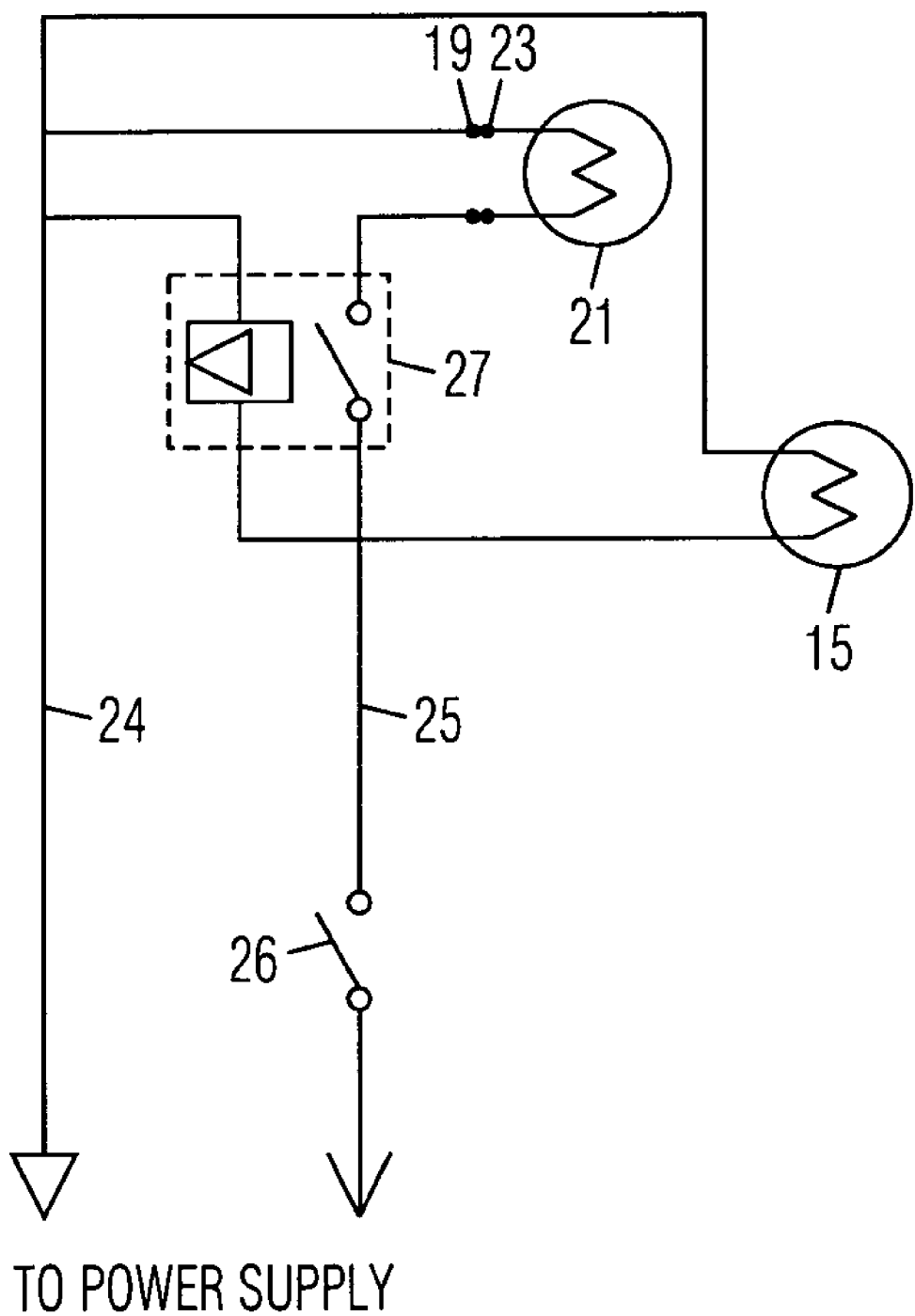
FIG. 3 is a circuit diagram thereof.

A circuit diagram of the boat light apparatus is shown in FIG. 3. Lamps 15 and 21 are connected in parallel to existing power leads 24 and 25 which were previously connected to the removed prior art navigation light. Power leads 24 and 25 are connected to a boat light switch 26 already installed in the boat. A step relay 27 is connected between bow light switch 26 and docking light 21. Step relay 27 is preferably positioned inside the navigation light housing. Connectors 19 on post 22 and housing 10 (FIG. 2) are shown as dots. Step relay 27 is toggled between open contact and closed contact each time power is applied and removed. The operation is as follows:

1. Starting with an open circuit in step relay, closing bow light switch activates lamp in navigation light to indicate the position of the bow.
2. Opening and closing bow light switch closes step relay to activate lamp in the docking light to illuminate the path ahead of the boat. The closed bow light switch also activates lamp in navigation light.

3. Opening and closing bow light switch opens step relay to deactivate lamp in the docking light. The closed bow light switch also activates lamp in the navigation light.
4. Opening bow light switch deactivates lamp in the navigation light.

Although the foregoing description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A boat light apparatus, comprising:

a navigation light comprising:

a navigation light housing;

a navigation light lamp in said navigation light housing;

a socket in said housing;

electrical connectors inside said socket;

a detachable docking light attached to said navigation light, comprising:

a docking light housing;

a docking light lamp in said docking light housing;

a post with a first end attached to said docking light housing, and a second end detachably connected to said socket;

electrical connectors at said second end of said post mating with said connectors inside said socket; and a removable cover sealing said socket and connected to said housing with a tether.

2. A boat light apparatus, comprising:

a navigation light comprising:

a navigation light housing;

a navigation light lamp in said navigation light housing;

a socket in said housing;

electrical connectors inside said socket;

a detachable docking light attached to said navigation light, comprising:

a docking light housing;

a docking light lamp in said docking light housing;

a post with a first end attached to said docking light housing, and a second end detachably connected to said socket;

electrical connectors at said second end of said post mating with said connectors inside said socket;

wherein said navigation light lamp and said docking light lamp are connected in parallel for being connected to a navigation light switch in a boat, and a step relay connected between said docking light lamp and said navigation light switch.

* * * * *